(12) United States Patent
McIntire et al.

(10) Patent No.: US 7,978,610 B1
(45) Date of Patent: *Jul. 12, 2011

(54) METHOD FOR ASYNCHRONOUS TRANSMISSION OF COMMUNICATION DATA BETWEEN PERIODICALLY BLANKED TERMINALS

(75) Inventors: William K. McIntire, Sandy, UT (US); Larry S. Thomson, Bountiful, UT (US); John J. Carver, II, Salt Lake City, UT (US)

(73) Assignee: L-3 Communications Corp., New York, NY (US)

(*) Notice: Subject to any disclaimer, the term of this patent is extended or adjusted under 35 U.S.C. 154(b) by 840 days.

This patent is subject to a terminal disclaimer.

(21) Appl. No.: 12/019,471

(22) Filed: Jan. 24, 2008

(51) Int. Cl.
*G01R 31/08* (2006.01)
*H04B 7/005* (2006.01)
*H04B 7/00* (2006.01)
*H04B 7/185* (2006.01)
*H04L 12/28* (2006.01)
*H04J 3/06* (2006.01)

(52) U.S. Cl. ............... 370/236.2; 370/278; 370/282; 370/310.1; 370/316; 370/350; 370/395.1; 370/503; 342/57; 342/58; 342/59; 342/82; 342/89; 342/118; 342/198

(58) Field of Classification Search .......... None
See application file for complete search history.

(56) References Cited

U.S. PATENT DOCUMENTS

| | | |
|---|---|---|
| 2,980,903 A | 4/1961 | Hagopian et al. |
| 3,460,139 A | 8/1969 | Rittenbach |
| 3,550,124 A | 12/1970 | Heft et al. |
| 3,946,384 A | 3/1976 | Westaway |
| 4,458,246 A | 7/1984 | Filipsson et al. |
| 4,733,238 A | 3/1988 | Fiden |
| 4,954,829 A | 9/1990 | Fiden |
| 5,898,666 A * | 4/1999 | Fukuda ............... 370/280 |
| 5,917,430 A | 6/1999 | Greneker, III et al. |
| 6,285,681 B1 | 9/2001 | Kolze et al. |
| 6,381,464 B1 * | 4/2002 | Vannucci ............... 455/456.1 |
| 6,396,586 B1 | 5/2002 | Wei et al. |
| 6,469,653 B1 | 10/2002 | Haynes |
| 6,606,033 B1 | 8/2003 | Crocker et al. |
| 6,616,611 B1 | 9/2003 | Moehring |
| 7,053,797 B2 | 5/2006 | Taylor |
| 7,102,536 B2 | 9/2006 | Scholz |
| 7,113,107 B2 | 9/2006 | Taylor |
| 2001/0022558 A1 | 9/2001 | Karr, Jr. et al. |
| 2003/0003874 A1 | 1/2003 | Nitta et al. |
| 2003/0156603 A1 | 8/2003 | Rakib et al. |
| 2003/0174663 A1 * | 9/2003 | Dillon ............... 370/316 |
| 2004/0032918 A1 * | 2/2004 | Shor et al. ............... 375/345 |
| 2004/0085938 A1 | 5/2004 | Tiedemann, Jr. et al. |

(Continued)

*Primary Examiner* — Seema S. Rao
*Assistant Examiner* — Christine Duong
(74) *Attorney, Agent, or Firm* — Kirton & McConkie; William T. Ralston

(57) ABSTRACT

A method for asynchronous transmission of communication data between periodically blanked terminals separated by an unknown distance is disclosed. A bursted signal is transmitted from a first terminal with a burst time $t_B$ and a burst cycle period T. The bursted signal is received at a second terminal. A bursted response signal is transmitted from the second terminal to the first terminal. The bursted response signal has a burst cycle period of T/2 and includes a pair of response bursts, with each burst in the pair having a burst time $t_A \leq T/2 - t_B$. Each burst in the pair of response bursts carries an identical data payload. At least one of the response bursts is received at the first terminal.

23 Claims, 4 Drawing Sheets

U.S. PATENT DOCUMENTS

| | | |
|---|---|---|
| 2004/0120304 A1 | 6/2004 | Kloos et al. |
| 2004/0147269 A1 | 7/2004 | Kim |
| 2004/0190597 A1 | 9/2004 | Cowie et al. |
| 2004/0266457 A1 | 12/2004 | Dupray |
| 2005/0025101 A1 | 2/2005 | Paneth et al. |
| 2006/0142913 A1 | 6/2006 | Coffee et al. |
| 2006/0183488 A1 | 8/2006 | Billhartz |
| 2006/0264185 A1 | 11/2006 | Jorgensen |
| 2006/0291537 A1 | 12/2006 | Fullerton et al. |

* cited by examiner

METHOD FOR ASYNCHRONOUS TRANSMISSION OF COMMUNICATION DATA BETWEEN PERIODICALLY BLANKED TERMINALS

BACKGROUND

Advancements in broadband wireless communication have changed the way we live. People can now communicate and transfer information using techniques that were thought of only in science fiction literature a half century ago. A wide variety of communication resources are available for consumers, businesses, government, and military. For example, a typical consumer traveling in his car can communicate using his cell phone, listen to music over a virtually uninterrupted digital satellite radio signal while traveling cross country, receive broadband data at his computer over a WiMAX connection, and listen to a local traffic report using a high definition radio receiver.

Unfortunately, each of these means of communication typically requires the use of a separate antenna. It is very possible that a typical car, in the next 10 to 20 years, may include five to ten different antennas. Placement of that number of antennas on a car can be difficult, from both a stylistic and a functional point of view. Not only can the antennas appear unsightly, but they can also cause interference with other antennas, as well as requiring expensive wiring within the automobile between each antenna and its associated receiver.

Placement of antennas on commercial and military mobile platforms can be even more challenging. Even large military ships are often limited in the types of communication they can receive due to a lack of space available for associated antennas. Aircraft can be similarly limited. An aircraft designed to travel at high speeds may not have room for, or tolerance for an antenna designed for communicating high speed data over large distances. To overcome this problem, the military uses specialized ships and aircraft for transmitting and relaying information. While this solution generally works, it can be extremely expensive and can increase risk for soldiers in the battlefield if a specific type of communication signal cannot be transmitted or received due to a lack of specialized antennas.

SUMMARY

A method for asynchronous transmission of communication data between periodically blanked terminals separated by an unknown distance is disclosed. A bursted signal is transmitted from a first terminal with a burst time $t_B$ and a burst cycle period T. The bursted signal is received at a second terminal. A bursted response signal is transmitted from the second terminal to the first terminal. The bursted response signal has a burst cycle period of T/2 and includes a pair of response bursts, with each burst in the pair having a burst time $t_A \leq T/2 - t_B$. Each burst in the pair of response bursts carries an identical data payload. At least one of the response bursts is received at the first terminal.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
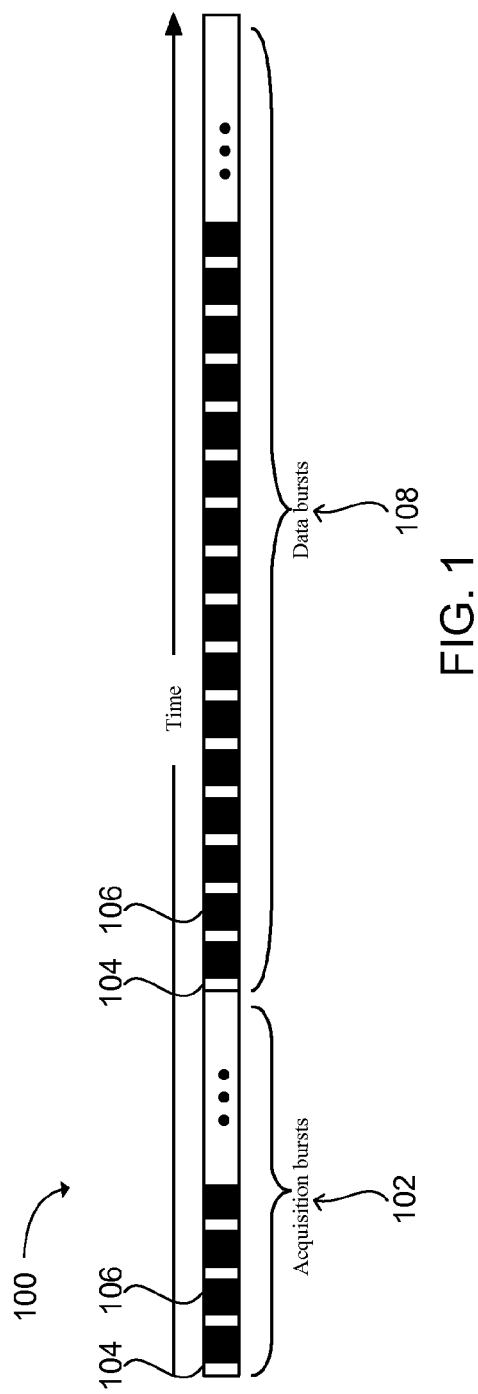
FIG. 1 is a block diagram illustrating a burst radar transmission comprising a continuous communication signal broken into segments in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

One method for overcoming the electrical, spatial, and/or mechanical limitations inherent in the use of multiple antennas on a single platform is to use an antenna for multiple purposes. For example, an antenna designed for transmitting and receiving radar bursts can also be used to transmit and receive data. While transmitting data using a radar antenna has been previously described, the data transmission typically entailed sending a command comprising few bits. Such a system would not be useful in providing high data rate communication capabilities.

A mobile platform or fixed installation containing a periodically blanked terminal such as a radar system may not have a data communications system, or the existing communication system may be insufficient for the needs of the platform. Adding or upgrading a communication system typically entails adding hardware which incurs cost, adds weight, and involves modification of the platform structure (mounting antennas, for example). These additional requirements could be reduced or eliminated if components of the radar system could be exploited for use in data communications.

For example, an aircraft may be configured with a high performance radar which is capable of collecting synthetic aperture radar (SAR) images. Synthetic aperture radar can provide detailed, high definition images. Without a high bandwidth data link, these images typically cannot be downloaded from the aircraft until the aircraft has landed. The addition of a high-speed data communications link allows the image to be downloaded to a ground or airborne platform, or transmitted to a satellite while the aircraft is still in flight.

A two way data link using a periodically blanked system such as a radar terminal can enable a mobile radar platform to both send and receive data. A two way data link can enable critical data to be transmitted to a mobile platform that otherwise lacks the ability to receive such data. The two way data link using a periodically blanked system may also provide a higher data rate link than other communications links on the mobile platform, enabling greater amounts of data to be received than is otherwise possible. Additionally, a two way data link can improve downlink communications from the mobile platform to a receiver by enabling communication between the radar system and the receiver, such as an acknowledgement that data sent by the radar was received by the receiver.

A periodically blanked terminal, as used herein, is defined to be a communications transceiver that is not capable of transmitting full time due to hardware limitations. For example, some radar equipment (due, for example, to thermal constraints) cannot operate continuously, and is only capable of transmitting short bursts. This is true in the case of radars installed on certain aircraft today. Other limitations that may constrain a transceiver from transmitting and receiving continuously can include frequency band limits. For example, in certain situations a transceiver may be used to transmit and receive at the same frequency. Time division duplex can be effectively used to negate the need for a costly and heavy diplexer. Power supplies and other hardware constraints may also limit the amount of time a transmitter can transmit.

In a typical radar used on modern, high performance aircraft, the burst period can be as short as several hundred nanoseconds or as long as several hundred microseconds. However, the bursts can still be used to carry data despite the relatively short period of each burst. Ordinarily, data links configured to transmit large amounts of data use a continuous data signal. Transmitting large amounts of data using a bursted radar signal having short period bursts requires a different solution, since large data files, such as high definition photographs, cannot be transmitted over a single burst.

To transmit the continuous data signal in discrete bursts, the communication signal can be broken into segments. Each segment can be transmitted within the length of the transmit bursts. The maximum length of these bursts will usually be constrained by the radar RF hardware, such as the need for cooling. However, other constraints are also conceivable. Use of a substantially maximum length of each burst to transmit data can be desirable. This burst length, minus any guard intervals allowed at the beginning and end of the burst, can be used to determine the length of the communication signal segments. FIG. 1 shows an example of a burst radar transmission 100 comprising a continuous communication signal broken into segments.

The burst radar transmission 100 can be configured to carry data at high data rates. The transmission can includes a plurality of bursts having a transmit period 104 followed by a blanking period 106 during which the radar equipment can cool. The blanking period can also be used to receive data at the radar. The blanking period can be several times as long as the transmit period. The ratio of the transmit period to the total time between pulses (pulse period) is typically referred to as the duty cycle. In one embodiment, the blanking period can be twice as long as the transmit period for a duty cycle of approximately 33%, although a range of ratios are possible, depending on the characteristics of the hardware and data link management issues, as can be appreciated.

A burst radar transmission can include one or more acquisition bursts 102. The acquisition bursts can include training sequences, frame synchronization sequences, and other sequences useful in synchronizing a receiver with the burst transmissions. The acquisition burst(s) can be followed by payload (data) bursts 108, configured to carry data at relatively high rates. This is discussed more fully in the copending U.S. patent application Ser. No. 11/592,536, filed on Nov. 3, 2006 and titled "System and Method for Transmitting High Data Rate Information from a Radar System", which is herein incorporated by reference in its entirety.

A modem is typically used to modulate data onto a carrier signal to form a communication signal. It is convenient if the modem is able to control the timing of the transmit periods in the RF hardware. This way, synchronization of the communication signal segments with the radar burst transmit periods 104 can be accomplished. In some cases this is not possible. Certain modern radar systems in use today which present just such a case, wherein the radar cannot accept control of the transmit periods from an external source, can use a method called macro time-division-duplex (macro TDD). In this case, the radar hardware can provide some sort of gate signal so that the modem can know the timing of the transmit burst cycle periods. The radar hardware may also provide a reference clock signal to which the gate signal is synchronized.

Figure 2:
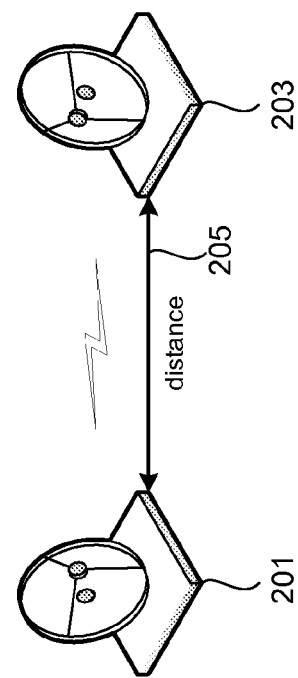
FIG. 2 is an illustration of two communications terminals separated by a distance in accordance with an embodiment of the present invention.

In other types of modern radar systems in use today, the radar can accept control of the transmit periods from an external source. In such systems, a communications method referred to as micro-time-division-duplex ($\mu$TDD) can be used to maximize the amount of data that can be communicated between bursted communication terminals where at least one of the terminals cannot transmit and receive continuously. For example, FIG. 2 illustrates one example of TDD using a first terminal 201 in wireless communication with a second terminal 203. One or both of the terminals may be built around a bursted wireless communication system such as a radar system. Full duplex communications between two radar systems can be accomplished by breaking the data to be transmitted into short bursts that are approximately equal in length to the radar burst. The burst is then modulated with the data, as previously discussed. Data can be received at each terminal during the blanking period 106 (FIG. 1) between the radar bursts. The terminals shown in FIG. 2 are for illustration purposes only and should not be construed as limiting in any way. The terminals shown are used to illustrate any type of wireless system wherein at least one of the terminals uses a bursted communication system between periodically blanked terminals to transmit information. At least one of the terminals can be a mobile terminal, such as a terminal mounted on a ground, water, air, or space based vehicle.

The data transmitted from one periodically blanked communications terminal using bursted communications may or may not be received at the other terminal, depending on where the other terminal is in its bursted transmit/receive cycle. A distance 205 between the two terminals 201, 203 determines how much propagation time occurs from transmission of the data at one terminal to reception of the data at the other terminal. As the distance between the terminals changes, the propagation time changes. The result may be a burst from a first terminal arriving at a second terminal while the second terminal is transmitting. When a transmit burst from one terminal arrives at another terminal during that terminal's transmit interval the result is referred to as a collision. Since radar systems commonly have a fixed burst repetition rate, it may not be possible to guarantee that no collisions occur. Specifically, as the distance between the terminals changes it is not possible to guarantee in a system using a fixed burst repetition rate that each transmitted burst will arrive at the second terminal during the second terminal's blanking period or receive cycle.

To enable full duplex communication between wireless bursted communication systems, $\mu$TDD can be used to substantially eliminate the possibility of data collisions between bursted communications terminals. One feature of $\mu$TDD that allows data to be sent without collisions is the ability to alter the burst cycle period of both terminals. The burst cycle period is defined as the time from the beginning of one burst until the beginning of the next burst (the combined on and off period). Alternatively, the burst cycle period can be measured at any point through the burst and blanking period cycle.

It has been discovered that when the burst cycle periods of both terminals are adjusted to be equal to twice the propagation time divided by an integer that communication can occur between the terminals without collisions. This can be summarized in the equation:

$$T = \frac{2t_p}{N}, \quad (1)$$

where T is the burst cycle period in seconds, $t_p$ is the propagation time between the first and second terminals in seconds, and N is a positive integer.

The propagation time between the bursted communications terminals can be calculated by determining the distance between the terminals using a variety of methods. For example, each of the bursted communications terminals can have a global positioning satellite (GPS) receiver that can be used to determine each terminals relative location. The distance between the terminals can be quickly calculated using the location information from the GPS receivers. However, even with accurate GPS information at each location, the information would have to be communicated between the locations. This information would likely have to be transmitted using a communications means other than the bursted communications terminals. The need for additional communications means can add complexity to the overall system.

In another embodiment, a pseudo-random bit sequence (PRBS) can be transmitted between the bursted communications terminals. In one embodiment, the elements of the PRBS sequence can be configured as range bits that can be included in each transmit burst. Other data, such as sync and user data symbols, may also be included. The receiving terminal can be synchronized to the PRBS and configured to transmit the range bits back to the originating terminal. The originating terminal can use the range bits to determine the number of burst cycle periods in the total propagation time. Knowledge of the number of burst cycle periods can be used to determine a course range measurement. Counting the symbol periods from the start of any transmit burst until the next received burst can provide fine range measurement to within one symbol of accuracy.

In order for the communications terminals to communicate in a timely manner that will enable the distance between the terminals to be accurately measured there must be some way of ensuring that the information transmitted on the bursts does not collide with burst transmissions at either terminal. The distance between the terminals can only be calculated in this manner if uninterrupted, collision free full duplex communication between the terminals can be guaranteed. If collisions were to occur then the timing of the response signal would be off, thereby diminishing the accuracy of the information needed to accurately measure the distance between the terminals.

The present invention provides a solution that enables two burst communication terminals separated by an unknown distance to effectively communicate with collision free, low-latency full duplex communication between the terminals. In one embodiment, a first burst communications terminal, referred to as Terminal A, can receive a bursted communication from a second burst communications terminal, referred to as Terminal B. Terminal B can be designated the master terminal. In one embodiment, the master terminal can be configured to transmit bursts with a known duty cycle and burst cycle period. In another embodiment, the duty cycle and burst cycle period of the master terminal signal can be measured at the slave terminal. Terminal A can be configured to be the slave terminal and can be set in a receive mode, wherein it does not transmit any bursts. The terminal that first transmits bursted data in a communication between two terminals can be designated the master terminal and the terminal that first receives bursted data can be designated the slave terminal.

When Terminal A receives a burst communication from Terminal B, a response signal sent from Terminal A to Terminal B can be guaranteed to not collide with bursts transmitted from Terminal B if Terminal A transmits pairs of bursts wherein the data in both bursts in a pair of bursts is identical, and the burst cycle period of Terminal A is set to be less than or equal to half the burst cycle period of terminal B while the burst length for Terminal A $t_o$ is limited to:

$$t_A \leq \frac{T}{2} - t_B, \quad (2)$$

wherein T is the burst cycle period of Terminal B, and $t_B$ is the burst length of Terminal B.

Figure 3:
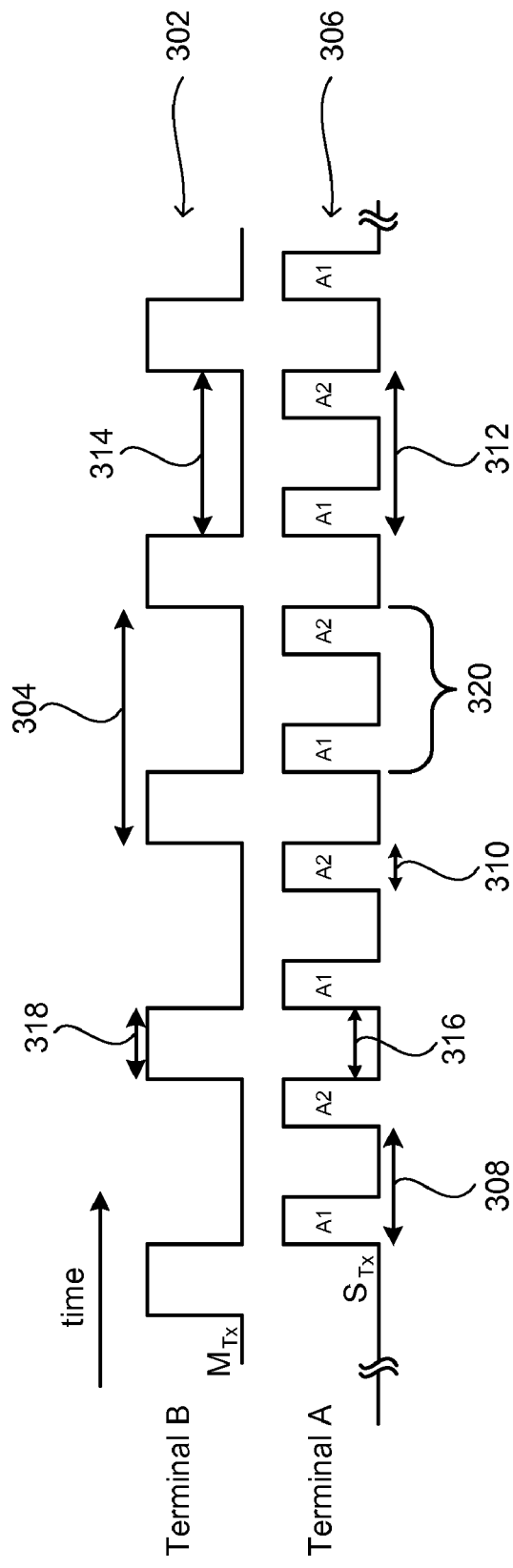
FIG. 3 is a timing diagram illustrating how pulsed signals can be transmitted and received between two terminals separated by a distance in accordance with a use of the present invention.

For example, as illustrated in FIG. 3, Terminal B can transmit a bursted master signal 302 having a burst cycle period T 304 of 100 microseconds and a burst length $t_B$ 318 of 33.3 microseconds. Upon reception of the bursted master signal at terminal A, the terminal can transmit a bursted slave signal 306 having a burst cycle period that is half that of the master signal received from Terminal B, or 50 microseconds (T/2). Using the equation above, the burst length of the bursted slave signal $t_A$ 310 can be set to less than or equal to 16.7 microseconds.

For the same amount of information sent on the burst from Terminal B in the example above to be sent on each of the pairs of bursts from Terminal A, the data must be sent at a data rate that is at least twice that of the data rate used in Terminal B. Alternatively, a symmetrical case wherein the burst length of the bursts transmitted from the master and slave terminals is equal if the duty cycle is properly selected for the master terminal. The burst length of Terminal A $t_A$ 310 is equal to the burst length of Terminal B $t_B$ 318 when a duty cycle of 25 percent is used at the master terminal, in this case Terminal B. For example, if Terminal B has a burst cycle period of 100 microseconds and a burst length of 25 microseconds then, using equation (2), Terminal A would use a burst cycle period of 50 microseconds and a burst length of 25 microseconds. Setting the duty cycle of the master terminal to 25% enables a maximum equivalent burst length for bursts transmitted by the master and slave terminals. Obviously, the burst lengths can also be made equivalent by setting the master terminal to have duty cycles less than 25% and by reducing the burst length of the bursts transmitted by the slave terminal to be equal to the burst lengths of the master terminal.

The result of setting the burst cycle period 308 of the slave transmit signal 306 to be half the burst cycle period 304 of the master transmit signal 302 and using equation (2) to set the burst length 310 of the slave transmit signal is that the dual burst interval 312 of the slave transmit signal is equal to the inter-burst period 314 of the master transmit signal. Additionally, the inter-burst interval 316 of the slave transmit signal is equal to or greater than the burst length 318 of the master transmit signal. This allows at least one of the pairs of bursts 320 having identical data payload information that are transmitted in the slave transmit signal to be received at Terminal B without a collision occurring, thereby ensuring that data transmitted from Terminal A arrives at Terminal B.

In one embodiment, the slave terminal can be configured to transmit a response to the master terminal immediately following the end of a burst received from the master signal. It should be noted that in equation (2) and the example illustrated in FIG. 3 that guard times have been ignored. Time division duplex systems typically include large guard intervals to accommodate propagation time. The method described above does not need to do so. In fact, the guard time requirements for this method are much smaller than those required for systems where propagation time influences guard time.

An appropriate guard time can be implemented by reducing the burst length of each of the pairs of bursts transmitted by the slave terminal to provide a desired guard interval to be included. The guard interval can also be produced by reducing the length of the master terminal burst. Alternatively, both the length of the slave terminal bursts and the master terminal burst can be reduced. It should be noted that adding a guard period does not change the burst cycle period T.

Adding a guard interval allows the periodically blanked terminals to switch between transmit and receive without loss of data. Other small errors in the signals can also occur, thereby resulting in the need for a guard period. For example, differing burst lengths can result from the modem tracking of the time bursts, which may not be exact. Additionally, inaccurate clocks, quantization due to symbol length and clock phase, fluctuation of tracking loop solutions, and so forth may result in inexact burst lengths. Therefore, the burst lengths of the master and slave terminals can be reduced to provide sufficient tolerance for these variations. A typical guard time may be as short as several nanoseconds and as long as tens of microseconds, depending upon the configuration of the terminals.

At least one, and potentially both of the pairs of bursts (identified as "A1" and "A2") transmitted from the slave terminal can be received at the master terminal. The data payload of both bursts in a pair of bursts can be identical, thus assuring that the desired data payload sent from the slave terminal to the master terminal will be received. In one embodiment, the pairs of bursts can be uniquely identified. One or more bits transmitted on the pairs of bursts can be used to provide a unique identifier. For example, a pair identification bit can be set to a high or "1" level in one of the bursts in the pair and a low or "0" level in the other of the bursts in the pair. This gives the master terminal the ability to identify whether the burst received was the first or second of the pair of bursts (A1 or A2).

Figure 4:
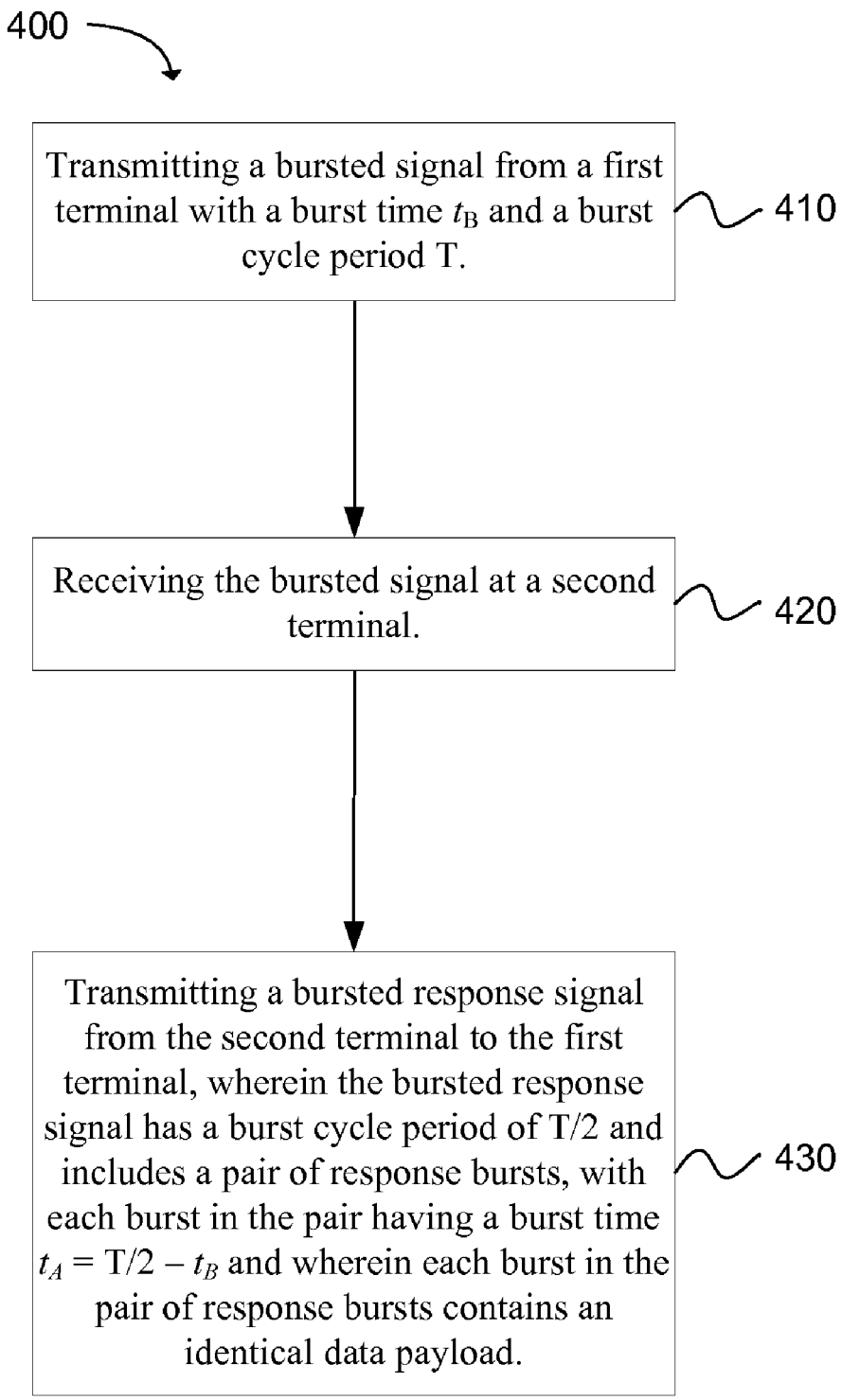
FIG. 4 is a flow chart depicting a method for asynchronous transmission of communication data between periodically blanked terminals separated by an unknown distance in accordance with an embodiment of the present invention.

In another embodiment, a method 400 for asynchronous transmission of communication data between periodically blanked terminals separated by an unknown distance is disclosed, as illustrated in the flow chart of FIG. 4. The method includes the operation of transmitting 410 a bursted signal from a first terminal with a burst time $t_B$ and a burst cycle period T. In one embodiment, the first terminal to transmit can be designated to be the master terminal.

A further operation of the method 400 involves receiving 420 the bursted signal at a second terminal. The second terminal, or slave terminal, can be configured to receive a signal from the master terminal. In one embodiment, the slave terminal can actively listen for a signal from another terminal and not be involved in data or radar transmission. An additional operation includes transmitting 430 a bursted response signal from the second terminal to the first terminal, wherein the bursted response signal has a burst cycle period of T/2 and includes a pair of response bursts. Each burst in the pair of response bursts has a burst time $t_A \leq T/2 - t_B$. Each burst in the pair of response bursts can carry an identical data payload.

In addition to the identical data payload, each burst in the pair of response bursts can include an identity bit configured to distinguish between the first and second bursts in the pair of response bursts. The identity bit enables a determination to be made at the first terminal as to which of the first and second bursts in each response burst pair was received, as previously discussed. The ability to identify which of the bursts is received can facilitate burst timing acquisition at the master terminal and increase the overall accuracy. In one embodiment, the identity bit can be the range bit transmitted in each of the bursts in the pair of response bursts. For example, in each pair of response bursts, the range bit in one burst can be inverted relative to the range bit in the other burst. This can enable the master terminal to identify which burst in the pair was received without the need to transmit additional information. As can be appreciated, a variety of techniques can be used to distinguish between the bursts in the pair of response bursts. Any technique that can be used to distinguish the bursts in the pair of response bursts is considered to be within the scope of the present invention.

In another embodiment, the identical payload carried by each pair can include a range bit configured to enable a distance between the first and second terminals to be determined. Each pair can include a separate bit in a pseudo-random bit sequence (PRBS). The first terminal can use the range bit to determine the number of pulse periods in the total propagation time. Knowledge of the number of pulse periods can be used to determine a course range measurement.

For example, in one embodiment the first terminal can be coupled to a cyclic pseudo-random bit sequence. The PRBS can have a predetermined length, such as $2^7-1$ bits. When the pulsed signal is transmitted from the first terminal to the second terminal, a bit from the PRBS sequence can be transmitted to the second terminal The PRBS range bits received at the second terminal can be repeated back to the first terminal, with each response burst pair transmitting a range bit from the second terminal to the first terminal. When a sufficient number of bursts have been received at the first terminal to identify the location in the received PRBS, it can be determined how much delay has occurred between the PRBS sequence in the received signal and the PRBS sequence operating at the first terminal. The delay between the received pattern and the running pattern in the first terminal is proportional to the signal's travel time.

Figure 5:
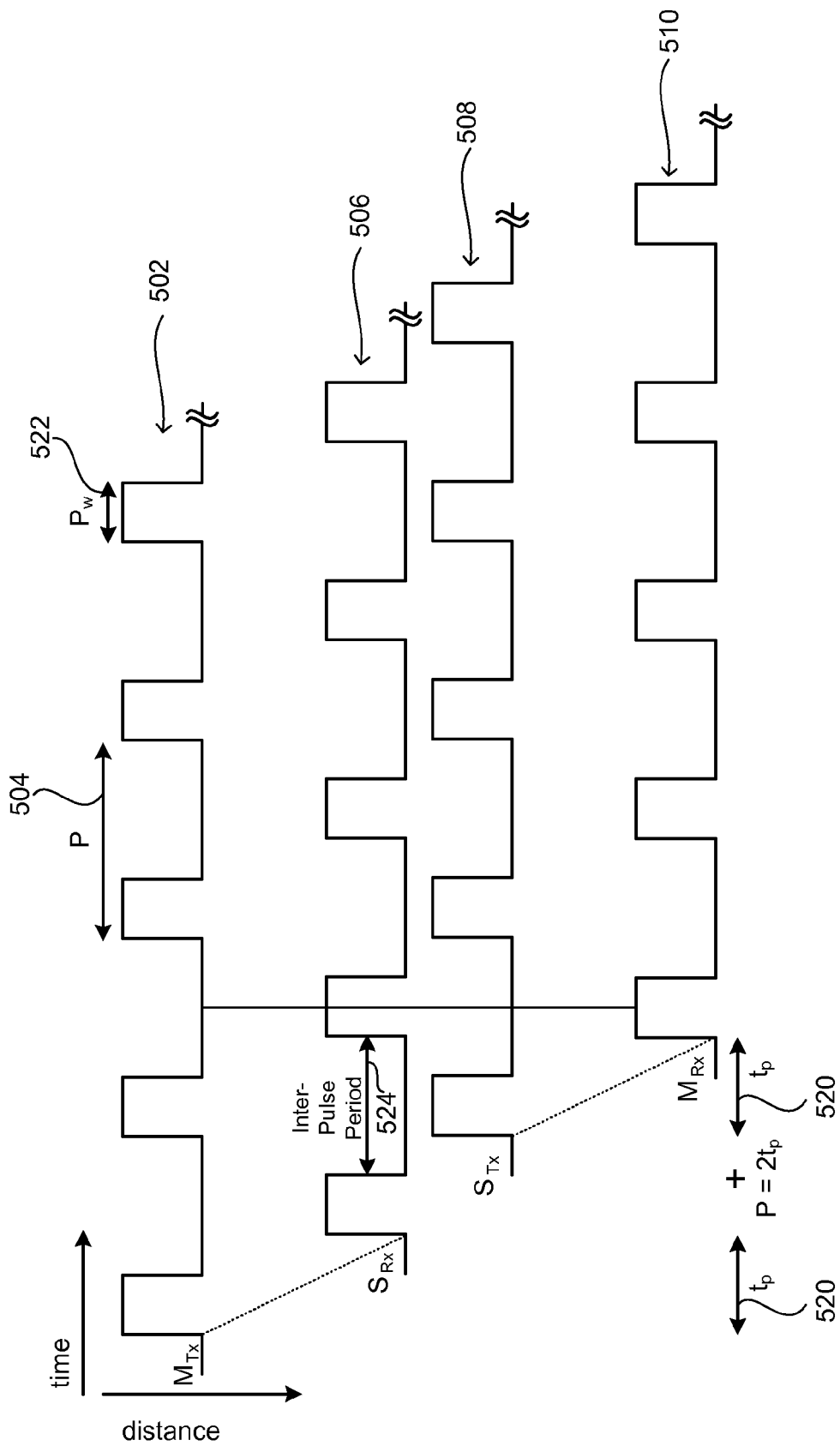
FIG. 5 is an illustration of a bursted master signal and a bursted slave signal in accordance with a use of the present invention.

Once the propagation time between the terminals is known, communication between the terminals can be optimized to provide maximum data transfer between the periodically blanked terminals. For example, FIG. 5 illustrates one exemplary use of the invention. Knowledge of the propagation time between periodically blanked terminals can be used in μTDD to set the burst cycle period 504 of both the master and slave terminals to be equal to twice the propagation time divided by an integer, as shown in equation (1). This allows bursted communications to occur between the terminals without collisions while maximizing the amount of data that can be communicated.

FIG. 5 shows a bursted master terminal signal 502 transmitted from the master terminal with a pulse period 504 set to be equal to twice the propagation time 520 between the terminals. Data can be transmitted on the bursts at a desired rate. With the pulse period set, the master terminal signal can travel from the master terminal to the slave terminal and be received 506 at the slave terminal after a period equal to the propagation time 520. The slave terminal can receive the data on the bursts from the master terminal. The slave terminal can also transmit a bursted slave terminal signal 508 to the master terminal.

In one embodiment, the slave terminal can time the bursted slave signal such that the bursts are substantially centered between 524 the received pulses from the master terminal. This provides a maximum guard period between the transmitted and received bursts at each of the terminals. The transmitted bursts, however, only need to be separated from the received bursts by a predetermined guard period, as previously discussed. The transmitted bursts from the slave terminal can travel to the master terminal and arrive at the master terminal after a propagation time 520. When the bursts in the bursted slave signal arrive at the master terminal, they can be received 510 between the bursts transmitted by the master terminal, enabling the master terminal to receive data on each pulse transmitted from the slave terminal.

The transmit pulses from each pulsed communications terminal can be received by the other communications terminal so long as the duty cycles of the two terminals add to be less than 100%. In one embodiment, both terminals can have duty cycles of less than 50%, as illustrated in FIG. 5, wherein the master and slave terminals each have duty cycles of approximately 30%. In another embodiment, the combined duty cycles of the terminals can be less than 95% to allow for a 2.5% guard period between transmitted and received pulses. The actual duty cycles of each terminal can be determined based on system needs. For example, if more information is to be transmitted from the master terminal to the slave terminal than vice versa, then the duty cycles of the master terminal may be set to be substantially larger than the duty cycles of the slave terminal. Alternatively, the duty cycles of each terminal may be set to be substantially equal, enabling data to be communicated between the terminals at the same rate.

The integer N in equation (1) can be selected to limit the pulse width of the transmit pulse to be within a reasonable time period for the radar transmitter such that physical constraints such as thermal and power supply problems are avoided. The propagation time may change significantly if the distance between the terminals is changing relatively quickly, such as when one or both of the terminals are mounted on an aircraft. The system can change the pulse period in response to the change in propagation time. It has been discovered that communication between terminals can be successful even with a rapid change in distance between the terminals. For example, with a relative velocity between the terminals on the order of 1000 nautical miles per hour, substantially collision free communication can be maintained by updating the pulse period at each of the terminals based on the changing propagation time at a rate of approximately once per second. With lower relative velocities between the terminals, the pulse period can be updated less frequently.

To avoid communication errors, the transmitter and receiver at the respective periodically blanked communications terminals can change the pulse period synchronously though offset by the propagation time using the range bit transmitted in each pulse, as previously discussed. The range bit can be used to derive an epoch signal. For example, the sequence can be an m-ary type PRBS such as the PRBS having a length of $2^7-1$, as previously discussed. If the PRBS is generated with a shift register, the epoch can be defined to occur when the shift register contains all "ones". Any method used to determine an epoch in the PRBS sequence is considered within the scope of this application.

The PRBS sequence can be transmitted by the first terminal and received at the second terminal offset by the propagation time. The second terminal can track the transmitted range bit and use a corresponding shift register that can provide a synchronous epoch signal to the first terminal that is offset by twice the propagation time. When the pulse period is changed by the transmitter in the first terminal, the first terminal can communicate the change with the second terminal. For example, the first terminal can set some control bits in the transmit frame at a start of the epoch. The receiver in the slave terminal can integrate the control bits using a soft accumulate method or other forward error correction methods, and develop very high confidence as to the new pulse period over the epoch interval. The first and second terminals can then change pulse periods on the next epoch. This allows data to be continuously sent between the first and second terminals even as the pulse period of the transmitters at each terminal is changed. This is discussed more fully in copending U.S. patent application Ser. No. 12/019,455, filed on the same day as the present application and titled "Method for Timing a Pulsed Communication System."

In one embodiment, the present invention enables the propagation time between two periodically blanked terminals separated by an unknown distance to be determined. Once the propagation time is known it can be used to maximize the amount of data that can be transmitted between the periodically blanked terminals. For example, the use of μTDD communications can enable pulsed communications terminals to transmit at maximum duty cycle with no data collisions. Also, the pulse period can be actively changed at the two terminals with little to no disruption in communication between the terminals. Consequently, the amount of energy used to communicate each bit is minimized between the terminals.

In another embodiment, continuous communication between the master terminal and the slave terminal can be maintained without the need to change the burst cycle period of the master and slave terminals. The master terminal can continue to transmit bursts as illustrated in FIG. 3 and previously discussed. Each of the bursts can include tens, hundreds, or multiple thousands of symbols representing bits of information.

The bursts transmitted from the master terminal can be received at the slave terminal. The slave terminal can transmit information back to the master terminal in pairs of bursts transmitted between the bursts received from the master terminal. The pairs of bursts can have a pulse width that is determined using equation (2), with each burst in the pair of bursts containing identical information, as previously discussed. The master terminal can be guaranteed to receive at least one of the pulses in each pair. Using this method, communication can be maintained at a rate of hundreds of megabits per second. This communication method can be continued indefinitely, enabling high speed communication between the master and slave terminals without the need to know the changing distance between the terminals.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for asynchronous transmission of communication data between periodically blanked terminals separated by an unknown distance, comprising:
transmitting a bursted signal from a first periodically blanked terminal with a burst time $t_B$ and a burst cycle period T;
receiving the bursted signal at a second periodically blanked terminal;

transmitting a bursted response signal from the second periodically blanked terminal to the first periodically blanked terminal, wherein the bursted response signal has a burst cycle period of T/2 and includes a pair of response bursts, with each burst in the pair of response bursts having a burst time $t_A \leq T/2 - t_B$ and wherein each burst in the pair of response bursts contains an identical data payload.

2. A method as in claim 1, wherein transmitting the bursted response signal from the second periodically blanked terminal further comprises transmitting the bursted response signal having a duty cycle and the burst cycle period that is previously known at the second periodically blanked terminal.

3. A method as in claim 1, wherein transmitting the bursted response signal from second periodically blanked terminal to the first periodically blanked terminal further comprises transmitting the bursted response signal having a duty cycle that is previously known at the first periodically blanked terminal.

4. A method as in claim 1, wherein transmitting the bursted signal further comprises transmitting the bursted signal having a transmit data payload.

5. A method as in claim 4, wherein transmitting the bursted signal further comprises transmitting the bursted signal having the transmit data payload, wherein the transmit data payload includes a range bit configured to enable a distance between the first periodically blanked terminal and the second periodically blanked terminal to be determined.

6. A method as in claim 4, wherein transmitting the bursted signal further comprises transmitting the bursted signal having the transmit data payload, wherein the transmit data payload includes information specifying a burst cycle period and a duty cycle of the bursted signal.

7. A method as in claim 1, further comprising determining at the second periodically blanked terminal a burst cycle period and a duty cycle of the bursted signal.

8. A method as in claim 5, wherein transmitting the bursted response signal further comprises transmitting the bursted response signal including a plurality of pairs of response bursts, wherein each burst in the pair of response bursts contains the identical data payload, wherein the identical data payload of each of the plurality of pairs of response bursts includes a range bit received on the bursted signal that is transmitted back to the first periodically blanked terminal.

9. A method as in claim 1, wherein transmitting the bursted response signal further comprises transmitting the bursted response signal including the pair of response bursts, wherein each burst in the pair of response bursts includes information configured to identify one of a first burst and a second burst in the pair of response bursts to determine which of the first burst and the second burst was received at the first periodically blanked terminal.

10. A method as in claim 9, wherein the information comprises a range bit that is included in the first burst and the second burst in the pair of response bursts, wherein the range bit is inverted in one of the first and the second bursts to identify which of the first and the second bursts in the pair of response bursts is received at the first periodically blanked terminal.

11. A method as in claim 1, further comprising setting the burst time $t_B$ of the first periodically blanked terminal at 25 percent duty cycles.

12. A method as in claim 1, further comprising transmitting the bursted response signal from the second periodically blanked terminal after receiving the bursted signal from the first periodically blanked terminal, wherein a guard period is provided between bursts on the bursted signal and bursts on the bursted response signal.

13. A method as in claim 12, further comprising providing the guard period between bursts on the bursted signal and bursts on the bursted response signal at the second periodically blanked terminal, wherein the guard period has a length between 2 nanoseconds and 100 milliseconds.

14. A method as in claim 12, further comprising providing the guard period between the bursts on the bursted signal and the bursts on the bursted response signal at the second periodically blanked terminal, wherein the guard period is provided by reducing the burst time $t_A$ of the bursts at the second periodically blanked terminal without changing the burst cycle period.

15. A method as in claim 1, wherein transmitting the bursted signal further comprises transmitting the bursted signal from the first periodically blanked terminal with the burst time $t_B$, wherein the burst time has a length between 5 nanoseconds and 100 milliseconds.

16. A method as in claim 1, wherein transmitting the bursted signal further comprises transmitting the bursted signal from the first periodically blanked terminal with the burst cycle period T, wherein the burst cycle period has a length between 10 nanoseconds and 200 milliseconds.

17. A system for asynchronous transmission of communication data between periodically blanked terminals separated by an unknown distance, comprising
 a first periodically blanked terminal configured to transmit a bursted signal with a burst time $t_B$ and a burst cycle period T;
 a second periodically blanked terminal configured to receive the bursted signal from the first periodically blanked terminal; and
 the second periodically blanked terminal configured to transmit a bursted response signal to the first periodically blanked terminal, wherein the bursted response signal has a burst cycle period of T/2 and includes a pair of response bursts, with each burst in the pair of response bursts having a burst time $t_A \leq T/2 - t_B$ and wherein each burst in the pair of response bursts contains an identical data payload to enable the first periodically blanked terminal to receive the data payload on at least one of the bursts in the pair of response bursts.

18. A system as in claim 17, wherein at least one burst in the bursted signal transmitted by the first periodically blanked terminal further comprises a transmit data payload including a range bit.

19. A system as in claim 18, wherein the identical data payload carried by the pair of response bursts in the bursted response signal includes a copy of the range bit received in the bursted signal from the first periodically blanked terminal.

20. A system as in claim 17, wherein each burst in the pair of response bursts further includes a unique identifier to enable at least one of a first burst and a second burst in the pair of response bursts to be identified at the first periodically blanked terminal.

21. A system as in claim 17, wherein the second periodically blanked terminal is further configured to add a guard period between bursts on the bursted signal received from the first periodically blanked terminal and the bursts on the bursted response signal generated at the second periodically blanked terminal, wherein the guard period is provided by reducing the burst time $t_A$ of the bursts at the second periodically blanked terminal without changing the burst cycle period.

22. A system as in claim 17, wherein the first and second periodically blanked terminals include modems capable of controlling timing of transmit periods in RF hardware coupled to each periodically blanked terminal to enable micro time-domain-duplex communications between the first and second periodically blanked terminals.

23. A system for asynchronous transmission of communication data between periodically blanked terminals separated by an unknown distance, comprising:

a transmitting means for emitting a bursted signal from a first periodically blanked terminal with a burst time $t_B$ and a burst cycle period T;

a receiving means for detecting the bursted signal at a second periodically blanked terminal; and a transmitting means for transmitting a bursted response signal from the second periodically blanked terminal to the first periodically blanked terminal, wherein the bursted response signal has a burst cycle period of T/2 and includes a pair of response bursts, with each burst in the pair of response bursts having a burst time $t_A \leq T/2 - t_B$ and wherein each burst in the pair of response bursts contains an identical data payload.

* * * * *